UNITED STATES PATENT OFFICE.

WERNER VON BOLTON, OF CHARLOTTENBURG, GERMANY, ASSIGNOR TO GENERAL ELECTRIC COMPANY, A CORPORATION OF NEW YORK.

PROCESS OF INCREASING THE DUCTILITY OF METALLIC TUNGSTEN.

1,017,280.   Specification of Letters Patent.   Patented Feb. 13, 1912.

No Drawing.   Application filed September 13, 1911. Serial No. 649,020.

*To all whom it may concern:*

Be it known that I, WERNER VON BOLTON, a subject of the Czar of Russia, and residing at Charlottenburg, near Berlin, Germany, have invented a certain new and useful Improved Process of Increasing the Ductility of Metallic Tungsten, of which the following is a specification.

According to my invention the ductility of tungsten is increased by treating the metal at a high temperature, preferably at red heat, with a halogen compound of an element of the sulfur or phosphorous group. Hydrogen is added to this halogen compound. A mixture of the vapors of protochlorid of sulfur with hydrogen is specially suitable. The chemical compounds subjected to the treatment, *e. g.*, the tungstic acid which is still contained in the metal or which, without employing pure metal, can be employed as the sole starting material, are then for the most part converted into sulfid of tungsten. The chlorin which is liberated is at once bound to the hydrogen and thereby the production of hybrids which can be disassociated only with very great difficulty is prevented. On the other hand, the admixed hydrogen favors the reduction and prevents the injurious formation of chlorids owing to the chlorin which is liberated. As a final product a mass is obtained which substantially consists of sulfid of tungsten or of metallic tungsten mixed with sulfid of tungsten. In order to obtain pure metallic tungsten of great ductility from this mass it is sufficient to heat the mass highly *in vacuo* by passing through it an electric current. If it is heated for example for some time to white heat while the air-pump is constantly working, a metallic mass which can be at once drawn or rolled is obtained, whereas the metallic mass obtained by directly reducing tungstic acid by means of hydrogen has very materially less ductility. This less degree of ductility appears to be due to the presence of hydrogen which can be expelled from tungsten only at very high temperatures and when special precautionary measures are taken.

In order to favor the expulsion of the foreign matter, *e. g.* sulfur, out of the metal and at once to obtain bodies of a shape adapted to be worked up further, the starting material to be treated is preferably brought into the form of a not too thick rod or filament which in proportion to its section has a large superficial area and can be readily connected to electrodes.

I claim:—

1. The process of increasing the ductility of metallic tungsten which consists in treating metallic tungsten at a high temperature with a mixture of hydrogen and a vaporizable halogen compound of sulfur, and in passing an electric current through the mass thereby obtained in an indifferent atmosphere and thereby expelling any sulfur from the said mass.

2. The process of securing metallic tungsten of good ductility which consists in heating the material to be converted into highly ductile metal at a high temperature in the presence of hydrogen and a halogen compound of sulfur, and heating the resulting product in an inert environment and thereby expelling the sulfur.

3. The process of increasing the ductility of metallic tungsten which consists in treating tungsten at a high temperature with a mixture of hydrogen and protochlorid of sulfur, and in passing an electric current through the mass thereby obtained in an indifferent atmosphere and thereby expelling any sulfur from the said mass.

4. The process of securing metallic tungsten of good ductility consisting in treating the material to be converted into highly ductile metal at a high temperature with a halogen compound of sulfur together with a reducing agent which will unite with the halogen and prevent combination of the halogen with the tungsten, and heating the resulting product in an inert environment to eliminate any sulfur introduced by the treatment.

In testimony whereof I have signed my name to this specification in the presence of two witnesses.

WERNER VON BOLTON.

Witnesses:
 HENRY HASPER,
 WOLDEMAR HAUPT.